US009357331B2

(12) United States Patent
Huang

(10) Patent No.: US 9,357,331 B2
(45) Date of Patent: May 31, 2016

(54) SYSTEMS AND APPARATUSES FOR A SECURE MOBILE CLOUD FRAMEWORK FOR MOBILE COMPUTING AND COMMUNICATION

(75) Inventor: Dijiang Huang, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 967 days.

(21) Appl. No.: 13/440,201

(22) Filed: Apr. 5, 2012

(65) Prior Publication Data
US 2012/0258777 A1 Oct. 11, 2012

Related U.S. Application Data

(60) Provisional application No. 61/473,477, filed on Apr. 8, 2011.

(51) Int. Cl.
*G06F 15/173* (2006.01)
*H04W 4/00* (2009.01)
*H04L 29/06* (2006.01)

(52) U.S. Cl.
CPC .............. *H04W 4/003* (2013.01); *H04L 63/20* (2013.01)

(58) Field of Classification Search
CPC .............. H04L 19/06; H04L 29/08072; H04L 29/08144
See application file for complete search history.

(56) References Cited

U.S. PATENT DOCUMENTS

| 6,886,096 B2 | 4/2005 | Appenzeller et al. ......... 713/170 |
| 8,606,878 B2 * | 12/2013 | Ferris ............................ 709/217 |
| 2010/0161541 A1 * | 6/2010 | Covannon et al. .............. 706/47 |
| 2011/0077027 A1 * | 3/2011 | Wang et al. ................. 455/456.3 |
| 2011/0246627 A1 | 10/2011 | Kern |
| 2011/0295658 A1 * | 12/2011 | Bastos et al. ................. 705/14.1 |
| 2012/0054624 A1 | 3/2012 | Owens, Jr. et al. |

(Continued)

FOREIGN PATENT DOCUMENTS

CN 101867472 10/2010

OTHER PUBLICATIONS

Securing Elastic Applications on Mobile Devices for Cloud Computing, Zhang et al., CCSW'09, Nov. 13, 2009, Chicago, Illinois, USA.*

(Continued)

*Primary Examiner* — Philip Chea
*Assistant Examiner* — Van Kim T Nguyen
(74) *Attorney, Agent, or Firm* — Norton Rose Fulbright US LLP

(57) ABSTRACT

Systems and apparatuses for a secure mobile cloud framework (referred to as MobiCloud) for mobile computing and communication are disclosed. Embodiments of MobiCloud transfer each mobile node from a traditional strictly layer-structured communication node into a service node (SN). Each SN may be used as a service provider or a service broker according its capability. Each SN may be incorporated as a virtualized component of the MobiCloud. In some embodiments, MobiCloud mirrors an SN to one or multiple virtual images in the Cloud for addressing communication and computation deficiencies of mobile devices. Virtual images can create a visualized MANET routing and communication layer that can maximally assist the mobile nodes to enable pervasive computing services for each mobile device owner. A secure data processing framework is disclosed for the MobiCloud.

20 Claims, 5 Drawing Sheets

(56) References Cited

U.S. PATENT DOCUMENTS

| | | | |
|---|---|---|---|
| 2012/0151057 A1* | 6/2012 | Paredes et al. | 709/225 |
| 2013/0054763 A1 | 2/2013 | Van der Merwe et al. | |
| 2014/0337930 A1* | 11/2014 | Hoyos et al. | 726/4 |

OTHER PUBLICATIONS

Secure Data Processing Framework for Mobile Cloud Computing, pp. 620-624, Huang et al.; IEEE2011.*
MobiCloud: Building Secure Cloud Framework for Mobile Computing and Communication, pp. 27-34, Huang et al.; IEEE2010.*
Goyal and Carter, "A lightweight secure cyber foraging infrastructure for resource-constrained devices," in *Proceedings of the 6th IEEE Workshop on Mobile Computing Systems and Applications*. 186-195, 2004.
Oberheide, et al., "Virtualized in-cloud security services for mobile devices," in *Proceedings of the First Workshop on Virtualization in Mobile Computing*. 31-35, 2008.
Zhang, et al., "Securing elastic applications on mobile devices for cloud computing," in *Proceedings of the 2009 ACM workshop on Cloud computing security*. 127-134, 2009.
"Cynature Networking and Consulting, Inc.," available at http://www.cncinc.net/, 2 pages, accessed May 17, 2012.
"Eucalyptus," available at http://www.eucalyptus.com/, 1 page, accessed May 17, 2012.
"Identity 2.0," http://en.wikipedia.org/wiki/Identity 2.0, 3 pages, accessed May 15, 2012.
"Minority graduate education at mountain states alliance (mcg@msa)," available at http://mati.eas.asu.edu:8421/MGE/brief.intro.html (2011), 88 pages.
"Opennebula," available at http://www.opennebula.org/, 3 pages, accessed May 17, 2012.
"Shibboleth Project," available at http://www.shibboleth.net, 1 page, accessed May 17, 2012.
"TCG specification architecture overview," available at https://www.trustedcomputinggroup.org (2007), 54 pages.
"VMware vSphere," available at http://www.vmware.com/products/vsphere/, 3 pages, accessed May 17, 2012.
Ahn and Lam., "Managing privacy preferences for federated identity management," Proceedings of the 2005 workshop on Digital identity management, pp. 28-36 (2005).
Alrodhan and Mitchell, "A client-side CardSpace-Liberty integration architecture," Proceedings of the 7th symposium on Identity and trust on the Internet, pp. 1-7 (2008).
Amazon, "Amazon elastic compute cloud," available at aws.amazon.com/ec2, 14 pages, accessed May 17, 2012.
Anwer and Feamster, "A Fast, Virtualized Data Plane for the NetFPGA," 5 pages, (2009).
Armbrust et al., "Above the clouds: A berkeley view of cloud computing," EECS Department, University of California, Berkeley, Tech. Rep. UCB/EECS-2009-28, 25 pages, (2009).
Balakrishnan et al., "TWOACK: preventing selfishness in mobile ad hoc networks," Wireless Communications and Networking Conference, *IEEE*, 6 pages (2005).
Balan et al., "Tactics-based remote execution for mobile computing," ACM MobiSys, 14 pages (2003).
Barreto et al., "Efficient and provably-secure identity-based signatures and signcryption from bilinearmaps," Advances in Cryptology—ASIACRYPT 2005, 515-532 (2005).
Basagni et al., "A distance routing effect algorithm for mobility (DREAM)," Proceedings of the 4th annual ACM/IEEE international conference on Mobile computing and networking, 76-84 (1998).
Bethencourt et al., "Ciphertext-Policy Attribute-Based Encryption," Proceedings of the 28th IEEE Symposium on Security and Privacy (Oakland), 15 pages, (2007).
Bhargav-Spantzel et al., "User centricity: a taxonomy and open issues," Journal of Computer Security, 15(5): 493-527 (2007).
Boneh and Waters, "A fully collusion resistant broadcast, trace, and revoke system," Proceedings of the 13th ACM conference on Computer and communications security, 30 pages (2006).
Boneh et al., "Collusion Resistant Broadcast Encryption with Short Ciphertexts and Private Keys," Advances in Cryptology-Crypto 2005: 25th Annual International Cryptology Conference, Santa Barbara, California, USA, 19 pages (2005).
Boneh and Waters, "Conjunctive, subset, and range queries on encrypted data," Proceedings of the 4th conference on Theory of cryptography, 29 pages (2007).
Boneh et al., "Fully collusion resistant traitor tracing with short ciphertexts and private keys," Advances in Cryptology—EUROCRYPT 2006, 29 pages (2006).
Boneh et al., "Hierarchical identity based encryption with constant size ciphertext," Advances in Cryptology—EUROCRYPT 2005, 440-456 (2005).
Boneh and Franklin, "Identity-based encryption from the weil pairing," SIAM J. of Computing, 3: 586-615 (2003).
Bowers et al., "Proofs of retrievability: Theory and implementation," Proceedings of the ACM workshop on Cloud computing security (2009).
Camp et al., "Location information services in mobile ad hoc networks," IEEE International Conference on Communications, 5 (2002).
Canetti et al., "Efficient Communication-Storage Tradeoffs for Multicast Encryption," Advances in Cryptology-Eurocrypt; 99, 1592:459-474 (1999).
Canetti et al., "Multicast security: a taxonomy and some efficient constructions," INFOCOM'99. Eighteenth Annual Joint Conference of the IEEE Computer and Communications Societies. Proceedings. IEEE, 9 Pages (1999).
Caronni et al., "Efficient security for large and dynamic multicast groups," Proceedings of the IEEE 7th International Workshop on Enabling Technologies: Infrastructure for Collaborative Enterprises (WET ICE; 98) (1998).
Chang et al., "Key management for secure Internet multicast using Boolean function minimization techniques," INFOCOM'99. Eighteenth Annual Joint Conference of the IEEE Computer and Communications Societies, 2 (1999).
Chase, "Multi-authority Attribute Based Encryption," Lecture Notes in Computer Science, 4392: 515-534 (2007).
Benaloh et al., "Patient Controlled Encryption: patient privacy in electronic medical records," Proceedings of the ACM workshop on Cloud computing security (2009).
Cheung et al., "Collusion-Resistant Group Key Management Using Attribute-Based Encryption," Technical report, Cryptology ePrint Archive Report 2007/161 (2007). http://eprint.iacr.org.
Cheung and Newport, "Provably secure ciphertext policy abe," Proceedings of the 14th ACM conference on Computer and communications security, 456-465 (2007).
Chong et al., "Multi-Tenant Data Architecture," Microsoft MSDN Document, available at http://msdn.microsoft.com/en-us/library/aa479086.aspx (2006), 18 Pages.
Chow et al., "Controlling data in the cloud: outsourcing computation without outsourcing control," Proceedings of the ACM workshop on Cloud computing security, 85-90 (2009).
Christodorescu et al., "Cloud security is not (just) virtualization security: a short paper," Proceedings of the ACM workshop on Cloud computing security, 97-102 (2009).
Chun et al., "Augmented Smartphone Applications Through Clone Cloud Execution," Proceedings of USENIX HotOS XII (2009).
Covington et al., "A packet generator on the netfpga platform," IEEE Symposium on Field-Programmable Custom Computing Machines (FCCM) (2009).
Delerablee et al., "Fully collusion secure dynamic broadcast encryption with constant-size ciphertexts or decryption keys," Pairing-Based Cryptography, 39-59 (2007).
Desmond NG et al., "Dynamic Balanced Key Tree Management for Secure Multicast Communications," IEEE Transactions on Computers, 56(5):590-605 (2007).
Dey et al., "Towards a better understanding of context and context-awareness," Proceedings of the workshop on the what, who, where, and how of context-awareness, 304-307 (2000).
Di Vimercati et al., "Over-encryption: management of access control evolution on outsourced data," Proceedings of the 33rd international conference on Very large data bases, 123-134 (2007).

(56) References Cited

OTHER PUBLICATIONS

Ding et al., "A static-node assisted adaptive routing protocol in vehicular networks," Proceedings of the fourth ACM international workshop on Vehicular ad hoc networks, 59-68 (2007).

Dondeti et al., "Scalable secure one-to-many group communication using dual encryption," Computer Communications, 23(17):1681-1701 (2000).

Ducamp et al., "Linux's Security Capabilities," available at http://www.hsc.fr/ressources/presentations/linux2000/linux2000.htm.en (2000).

Emura et al., "A ciphertext-policy attribute-based encryption scheme with constant ciphertext length," Proceedings of the 5th International Conference on Information Security Practice and Experience, 13-23 (2009).

Enterprise, "Department of Defense Global Information Grid Architectural Vision," (2007).

Ericksson et al., "Truelink: A practical countermeasure to the wormhole attack in wireless networks," Proceedings of the 14th IEEE International Conference on Network Protocols, 75-84 (2000).

Fan et al., "Group key management with collusion-scalability tradeoffs using a hybrid structuring of receivers," Proceedings of the IEEE International Conference on Computer Communications Networks (2002).

Fiat et al., "Broadcast Encryption," Advances in Cryptology-Crypto; 93. Lecture Notes in Computer Science, 773:480-491 (1994).

Gafni et al., "Efficient methods for integrating traceability and broadcast encryption," Lecture Notes in Computer Science, :372-387 (1999).

Garay et al., "Long-lived broadcast encryption," Lecture Notes in Computer Science, :333-352 (2000).

Goodrich et al., "Efficient tree-based revocation in groups of low-state devices," Lecture Notes in Computer Science, :511-527 (2004).

Goyal et al., "Attribute-based encryption for fine-grained access control of encrypted data," Proceedings of the 13th ACM conference on Computer and communications security, 89-98 (2006).

Halevy et al., "The LSD broadcast encryption scheme," Lecture Notes in Computer Science, :47-60 (2002).

Harney et al., "Group key management protocol (GKMP) architecture," Technical report, RFC 2094 (1997).

Harney et al., "Group key management protocol (GKMP) specification," Technical report (1997).

Hodges et al., "Glossary for the OASIS Security Assertion Markup Language (SAML) V2.0," OASIS SSTC (Mar. 2005).

Hong et al., "Sat: Building new trust architecture for vehicular networks," Proceedings of the 3rd ACM International Workshop on Mobility in the Evolving Internet Architecture (MobiArch) (2008).

Hsu et al., "Secure File System Services for Web 2.0 Applications," Proceedings of the 2009 ACM workshop on Cloud computing security (2009).

Hu et al., "Ariadne: A Secure On-Demand Routing Protocol for Ad Hoc Networks," Wireless Networks, 11(1): 21-38 (2005).

Hu et al., "Packet Leashes: A Defense against Wormhole Attacks in Wireless Ad Hoc Networks," Proceedings of IEEE Computer and Communications Societies (INFOCOM), 1976-1986 (2003).

Hu et al., "Rushing Attacks and Defense in Wireless Ad Floc Network Routing Protocols," Proceedings of ACM Workshop on Wireless Security (WiSe), 30-40 (2003).

Hu et al., "SEAD: secure efficient distance vector routing for mobile wireless ad hoc networks," Ad Hoc Networks, 1(1): 175-192 (2003).

Huang et al., "On Providing Confidentiality for Link State Network Routing Protocol."

Huang et al., "Secure Link State Routing Protocol: A Framework for Network Survivability."

Huang et al., "Strategies for Addressing Link State Routing Protocol Vulnerabilities: A Panoramic View."

Huang et al., "A Byzantine Resilient Multi-path Key Establishment Scheme and Its Robustness Analysis for Sensor Networks," Proceedings of 5th IEEE International Workshop on Algorithms for Wireless, Mobile, Ad Hoc and Sensor Networks, 240b (2005).

Huang et al., "A double authentication scheme to detect impersonation attack in link state routing protocols," Proceedings of IEEE International Conference on Communications (ICC), 1723-1727 (2003).

Huang et al., "A Key-chain Based Keying Scheme for Many-to-Many Secure Group Communication," ACM Transactions on Information and System Security, 7(4): 523-552 (2004).

Huang et al., "A Secure Group Key Management Scheme for Hierarchical Mobile Ad-hoc Networks," Ad Hoc Networks, 6(4): 560-577 (2008).

Huang et al., "An Information Theoretic Approach for MANET Unlinkability Measure (ICME)," Proceedings of the Fourth International Conference on Mobile Computing and Ubiquitous Networking (2008).

Huang et al., "ASPE: attribute-based secure policy enforcement in vehicular ad hoc networks," Ad Hoc Networks (2009).

Huang et al., "Establishing email-based social network trust for vehicular networks," Proceedings of IEEE CCNC, Special Session on Social Networking (2010).

Huang et al., "Gradual Identity Exposure Using Attribute-Based Encryption," Proceedings of the Second IEEE International Conference on Information Privacy, Security, Risk and Trust (2010).

Huang et al., "Location-aware Key Management Scheme for Wireless Sensor Networks," Proceedings of ACM Workshop on Security of Ad Hoc and Sensor Networks (SASN), 29-42 (2004).

Huang et al., "Low-latency mix using split and merge operations," The third special issue on Security and Management, Springer Journal of Network and Systems Management (2010).

Huang et al., "Mobicloud: A secure mobile cloud framework for pervasive mobile computing and communication," in Proceedings of 5th IEEE International Symposium on Service-Oriented System Engineering (2010).

Huang et al., "Modeling Pairwise Key Establishment for Random Key Predistribution in Large-scale Sensor Networks," IEEE/ACM Transactions on Networking, 15: 1204-1215 (2007).

Huang et al., "New Architecture for Intra-Domain Network Security," Communications of the ACM, 49(11): 64-72 (2006).

Huang et al., "On Providing Confidentiality in Link State Routing Protocol," Proceedings of IEEE Consumer Communications and Networking Conference, 671-675 (2006).

Huang et al., "Secure Data Processing Framework for Mobile Cloud Computing," IEEE Infocom Workshop on Cloud Computing, 620-624 (2011).

Huang et al., "Secure Pairwise Key Establishment in Large-scale Sensor Networks: an Area Partitioning and Multi-group Key Predistribution Approach," ACM Transactions on Sensor Networks, 3(16) (2007).

Huang et al., "Source Routing Based Pairwise Key Establishment Protocol for Sensor Networks," Proceedings of 24th IEEE International Performance Computing and Communications Conference, 177-183 (2005).

Huang et al., "Towards lightweight secure communication protocols for passive RFIDs," The 6th IEEE Communications Society Conference on Sensor, Mesh and Ad Hoc Communications and Networks (SECON) (2009).

Huang et al., "Trust Analysis of Link State Network Routing," Proceedings of 2nd International Workshop on Trust Internet (TIW) (2003).

Huang, "A Pseudonym-Based Cryptography for Anonymous Communications in Mobile Ad-hoc Networks," Special Issue on Cryptography in Networks, International Journal of Security and Networks (IJSN), 2(3-4): 272-283 (2007).

Huang, "An Identity-Based Blind Key Generation and Signature Scheme," Proceedings of Conference on Information Security and Cryptology (CISC), 65-73 (2005).

Huang, "On an Information Theoretic Approach to Model Anonymous MANET Communications," Proceedings of the IEEE International Symposium on Information Theory (ISIT), 1629-1633 (2009).

Huang, "On Measuring Anonymity for Wireless Mobile Ad-hoc Networks," Proceedings of 2nd IEEE International Workshop on Performance and Management of Wireless and Mobile Networks (P2MNet), 779-786 (2006).

(56) References Cited

OTHER PUBLICATIONS

Huang, "Traffic Analysis-based Unlinkability Measure for IEEE 802.11b-based Communication Systems," Proceedings of ACM Workshop on Wireless Security (WiSe), 65-74 (2006).
Huang, "Unlinkability Measure for IEEE 802.11 Based MANETs," IEEE Transactions on Wireless Communications, 7(3): 1025-1034 (2008).
Huang, "Using Delaunay Triangulation to Construct Obstacle Detour Mobility Model," Proceedings of IEEE Wireless Communications and Networking Conference (WCNC), 1644-1649 (2005).
Huang, Wireless and Sensor Networks Security, Nova Science Publishers, Inc., ch. Secure Multi-path Data Delivery in Wireless Sensor Networks (2008).
Hunt et al., "The coign automatic distributed partitioning system," Proceedings of USENIX Symposium on Operating Systems Design and Implementation (OSDI) (1999).
IETF PIIX Working Group, "Public-key infrastructure (x.509) (pkix)," available at http://www.ietf.org/html.charters/pkix-charter.html, Internet RFCs.
Jain et al., "Geographical routing using partial information for wireless ad hoc networks," Personal Communications, IEEE, 8(1): 48-57 (2001).
Johnson et al., "The dynamic source routing protocol (dsr) for mobile ad hoc networks for ipv4," IETF RFC4728 (2007).
Josang et al., "User centric identity management," AusCERT Asia Pacific Information Technology Security Conference (2005).
Juang et al., "Energy-efficient computing for wildlife tracking: design tradeoffs and early experiences with ZebraNet," ACM SIGPLAN Notices, 37(10): 96-107 (2002).
Julien, "Context-Aware Middleware Abstractions for Ad Hoc Mobile Computing," URL: http://www.cse.wustl.edu/mobilab/pubs/proposal.pdf (2003).
Kandiah et al., "C-Mix: A lightweight Anonymous Routing Approach," Proceedings of Information Hiding (2008).
Kandiah et al., "Re-distribution of Traffic Flow in Mix Networks—Split Mix," Arizona State University, available at http://snac.eas.asu.edu/snac/document/split.pdf (2008).
Kannhavong et al., "A study of a routing attack in OLSR-based mobile ad hoc networks," International Journal of Communication Systems, 20(11): 1245-1261 (2007).
Kapoor et al., "Secret-sharing based secure communication protocols for passive rfids," Proceedings of IEEE Globecom, CISS, 1-9 (2009).
Karp et al., "GPSR: Greedy Perimeters Stateless Routing for Wireless Network," Proceedings of ACM/IEEE Mobicom, 243-254 (2000).
Katz et al., "Predicate encryption supporting disjunctions, polynomial equations, and inner products," Proceedings of the theory and applications of cryptographic techniques 27th annual international conference on Advances in cryptology, 146-162 (2008).
Ko et al., "Location-Aided Routing (LAR) in mobile ad hoc networks," Wireless Networks, 6(4): 307-321 (2000).
Korkmaz et al., "Urban mutli-hop broadcast protocol for inter-vehicle communication systems," Proceedings of the 1st ACM international workshop on Vehicular ad hoc networks, 76-85 (2004).
Kurosawa et al., "Detecting Blackhole Attack on AODV-Based Mobile Ad Hoc Networks by Dynamic Learning Method," IEIC Technical Report, 105(627): 65-68 (2006).
Lam et al., "TrackBack Spam: Abuse and Prevention," Proceedings of the ACM workshop on Cloud computing security (2009).
Lamport et al., "The Byzantine Generals Problem," ACM Transactions on Programming Languages and Systems, 4(3): 382-401 (1982).
Li et al., "A scalable location service for geographic ad hoc routing," Proceedings of the 6th annual international conference on Mobile computing and networking, 120-130 (2000).
Li et al., "Attribute-Based Ring Signatures," IACR ePrint (2008).
Li et al., "Batch rekeying for secure group communications," Proceedings of the 10th international conference on World Wide Web, :525-534 (2001).
Li et al., "Deploying Mobile Computation in Cloud Service," Proceedings of the First International Conference for Cloud Computing (CloudCom) (2009).
Liang et al., "On Economic Mobile Cloud Computing Model," Lecture Notes of the Institute for Computer Sciences, Social Informatics and Telecommunications Engineering, 76: 329-341 (2012).
Liu et al., "Efficient self-healing group key distribution with revocation capability," Proceedings of the 10th ACM conference on Computer and communications security, :231-240 (2003).
Liu et al., "Enhanced Reputation Mechanism for Mobile Ad Hoc Networks," Lecture Notes in Computer Science, 48-62 (2004).
Lockwood et al., "Net FPGA—an open platform for gigabit-rate network switching and routing," IEEE International Conference on Microelectronic Systems Education (2007).
Lynn, On the implementation of pairing-based cryptosystems. PhD thesis, Stanford University, http://crypto.stanford.edu/pbc/thesis.pdf(2007).
Lyons et al., "Context-aware composition," Proceedings of the 10th workshop on Mobile Computing Systems and Applications, 12 (2009).
Lyons et al., "Multi-display Composition: Supporting Display Sharing for Collocated Mobile Devices," Proceedings of the 12th IFIP TC 13 International Conference on Human-Computer Interaction: Part I (2009).
Maihofer et al., "Abiding geocast: time-stable geocast for ad hoc networks," Proceedings of the 2nd ACM international workshop on Vehicular ad hoc networks, 20-29 (2005).
Malakooti et al., "Multiple Criteria Network Routing with Simulation Results," Proc. 15th Industrial Engineering Research Conference (IERC) (2006).
Marti et al., "Mitigating Routing Misbehavior in Mobile Ad Hoc Networks," Proceedings of the 6th annual international conference on Mobile computing and networking, 255-265 (2000).
Mascolo et al., "SCAR: context-aware adaptive routing in delay tolerant mobile sensor networks," Proceedings of the 2006 international conference on Wireless communications and mobile computing, ACM, 538 (2006).
McCluskey, "Minimization of Boolean functions," Bell System Technical Journal, 35(5): 1417-1444 (1956).
McGrew et al., "Key establishment in large dynamic groups using one-way function trees," Manuscript submitted to IEEE Transactions on Software Engineering. A full version of the paper appears in http://download.nai.com/products/media/nai/misc/oft052098.ps (1998).
Medhi et al., "Secure and Resilient Routing: A Framework for Resilient Network Architectures," Information Assurance: Dependability and Security in Network Systems, Morgan Kaufmann Publishers (2007).
Merrels, "DIX: Digital Identity Exchange Protocol," Internet Draft (Mar. 2006).
Messer et al., "Towards a distributed platform for resource-constrained devices," International Conference on Distributed Computing Systems, 22: 43-51 (2002).
Mittra et al., "A framework for scalable secure multicasting," ACM SIGCOMM Computer Communication Review, 27(4):277-288 (1997).
Miyaji et al., "New explicit conditions of elliptic curve traces for FR-reduction," IEICE Transactions on Fundamentals of Electronics, Communications and Computer Sciences, 84(5):1234-1243 (2001).
Moyer et al., "A survey of security issues in multicast communications," Network, IEEE, 13(6)12-23 (1999).
Musolesi et al., "CAR: Context-Aware Adaptive Routing for Delay-Tolerant Mobile Networks," IEEE Transactions on Mobile Computing, 8(2): 246-260 (2009).
Mutaf, "Pocket Bluff: A cooperation enforcing scheduled pocket switching protocol," Institut National de Recherche en Informatique et en Automatique, Technical Report No. 5664 (2005).
Naor et al., "Efficient trace and revoke schemes," Financial cryptography: 4th international conference, FC 2000, Anguilla, British West Indies, Feb. 20-24, 2000: proceedings, pp. 1, 2001. Springer Verlag.
Naor et al., "Revocation and tracing schemes for stateless receivers," Lecture Notes in Computer Science, 41-62 (2001).

(56) References Cited

OTHER PUBLICATIONS

Ni et al., "Determination of optimal call admission control policy in wireless networks," IEEE Transactions on Wireless Communications, 8(2): 1038-1044 (2009).
Ning et al., "How to misuse AODV: a case study of insider attacks against mobile ad-hoc routing protocols," Ad Hoc Networks, 3(6): 795-819 (2005).
Oasis Working Draft, "An introduction to XRIs" (2005).
Ostrovsky et al., "Attribute-based encryption with non-monotonic access structures," Proceedings of the 14th ACM conference on Computer and communications security, 195-203 (2007).
Papadimitratos et al., "Secure Routing for Mobile ad hoc Networks," SCS Communication Networks and Distributed Systems Modeling and Simulation Conference (CNDS), 1-27 (2002).
Pering et al., "Enabling pervasive collaboration with platform composition," Pervasive Computing, 184-201 (2009).
Perkins et al., "Ad Hoc on Demand Distance Vector (AODV) Routing," IETF RFC3561 (2003).
Perrig et al., "A New Protocol for Efficient Large-Group Key Distribution," IEEE Symposium on Security and Privacy, 247-262 (2001).
Pirretti et al., "Secure attribute-based systems," Proceedings of the 13th ACM conference on Computer and communications security, 99-112 (2006).
Poovendran et al., "An information-theoretic approach for design and analysis of rooted-tree-based multicast key management schemes," IEEE Transactions on Information Theory, 47(7): 2824-2834, (2001).
Qin et al., "A Statistical Traffic Pattern Discovery System for MANETs," MILCOM (2009).
Qin et al., "OLAR: On-demand Lightweight Anonymous Routing in MANETs," The Fourth International Conference on Mobile Computing and Ubiquitous Networking (ICMU) (2008).
Qin et al., "VehiCloud: Cloud Computing Facilitating Routing in Vehicular Networks," Infocom (2011).
Rafaeli et al., "A survey of key management for secure group communication," ACM Computing Surveys (CSUR), 35(5):309-329 (2003).
Raj et al., "Resource management for isolation enhanced cloud services," Proceedings of the 2009 ACM workshop on Cloud computing security, 97-102 (2009).
Ramachandran et al., "Computing Cryptographic Algorithms in Portable and Embedded Devices," Portable Information Devices, 2007. PORTABLE07. IEEE International Conference on, 25-29:1-7 (2007).
Ramjee et al., "On optimal call admission control in cellular networks," Wireless Networks, 3(1): 29-41 (1997).
Raykova et al., "Secure Anonymous Database Search," Proceedings of the ACM workshop on Cloud computing security (2009).
Recordon et al., "OpenID 2.0: a platform for user-centric identity management," Proceedings of the second ACM workshop on Digital identity management, 16 (2006).
Refaei et al., "A Reputation-based Mechanism for Isolating Selfish Nodes in Ad Hoc Networks," Proceedings of the IEEE Annual International Conference on Mobile and Ubiquitous Systems: Networking and Services (MOBIQUITOUS) (2005).
Ristenpart et al., "Hey, You, Get Off of My Cloud: Exploring Information Leakage in Third-Party Compute Clouds," ACM Conference on Computer and Communications Security (2009).
Riva et al., "Context-aware migratory services in ad hoc networks," IEEE Transactions on Mobile Computing, 1313-1328 (2007).
Safavi-Naini et al., "New constructions for multicast re-keying schemes using perfect hash families," Proceedings of the 7th ACM conference on Computer and communications security, pp. 228-234. ACM New York, NY, USA (2000).
Sahai et al., "Fuzzy Identity-Based Encryption," Advances in Cryptology-Eurocrypt, 3494: 457-473, Springer (2004).
Sandhu et al., "Role-based access control models," Computer, 29(2): 38-47 (1996).
Santos et al., "Towards trusted cloud computing," Proceedings of USENIX HotCloud (2009).
Sanzgiri et al, "A secure routing protocol for ad hoc networks," Proceedings of the 10th IEEE International Conference on Network Protocols, 78-87 (2002).
Sasao et al., "Bounds on the average number of products in the minimum sum-of-products expressions for multiple-value input two-valued output functions," IEEE Transactions on Computers, 40(5): 645-651 (1991).
Secure Networking and Computing Research Group (SNAC), "MobiCloud," available at http://mobicloud.asu.edu (2010).
Shamir et al., "How to Share a Secret," Communications of the ACM, 22(11): 612-613 (1979).
Sherman et al., "Key Establishment in Large Dynamic Groups Using One-Way Function Trees," IEEE Transactions on Software Engineering, :444-458, 2003.
Snoeyink et al., "A lower bound for multicast key distribution," Computer Networks, 47(3):429-441 (2005).
Sobey et al., "Browser Interfaces and Extended Validation SSL Certificates: An Empirical Study," Proceedings of the ACM workshop on Cloud computing security (2009).
Su et al., "Haggle: Clean-slate networking for mobile devices," Technical Report, UCAM-CL-TR-680, University of Cambridge (2006).
Sun et al., "Information theoretic framework of trust modeling and evaluation for ad hoc networks," IEEE Journal on Selected Areas in Communications, 24(2): 305-317 (2006).
Tseng et al., "A Specification-Based Intrusion Detection Model for OLSR," Lecture Notes in Computer Science, 3858: 300 (2006).
Verma et al., "Pseudo-IDM: an Anonymous Solution for Identity Management," Arizona State University, available at http://snac.eas.asu.edu/snac/document/pseudonym.pdf (2008).
Wallner et al., "Key Management for Multicast: Issues and Architectures RFC 2627," IETF (1999).
Wang et al., "An effective intrusion detection approach for OLSR MANET protocol," 1st IEEE ICNP Workshop on Secure Network Protocols, 55-60 (2005).
Wang et al., "Secure and efficient access to outsourced data," Proceedings of the ACM workshop on Cloud computing security, 55-66 (2009).
Want et al., "Dynamic composable computing," Proceedings of the 9th workshop on Mobile computing systems and applications, 17-21 (2008).
Waters, "Ciphertext-policy attribute-based encryption: An expressive, efficient, and provably secure realization," ePrint report, 290 (2008).
Wei et al., "Managing security of virtual machine images in a cloud environment," Proceedings of the ACM workshop on Cloud computing security, 91-96 (2009).
Wenning et al., "A Generic Framework for Context-Aware Routing and its Implementation in Wireless Sensor Networks," ITG-Fachbericht-Mobilkommunikcation-Technologien and Anwendungen (2009).
Williams et al., "A Group Force Mobility Model," Proceedings of 29th Annual Simulation Symposium, 333-340 (2006).
Williams et al., "Group force mobility model and its obstacle avoidance capability," Journal of the International Academic of Astronautics, Acta Astronautica, 65(7-8): 949-957 (2009).
Williams et al., "Group Force Mobility Models and Their Obstacle Avoidance Capability," Proceedings of the 57th International Astronautically Congress (2006).
Wong et al., "Secure group communications using key graphs," IEEE/ACM Transactions on Networking, 8(1):16-30 (2000).
Wu et al., "MDDV: a mobility-centric data dissemination algorithm for vehicular networks," Proceedings of the 1st ACM international workshop on Vehicular ad hoc networks, 47-56 (2004).
Wyse, "Applying Location-Aware Linkcell-Based Data Management to Context-Aware Mobile Business Services," International Conference on the Management of Mobile Business (ICMB) (2007).
Yadumurthy et al., "Reliable MAC broadcast protocol in directional and omni-directional transmissions for vehicular ad hoc networks," Proceedings of the 2nd ACM international workshop on Vehicular ad hoc networks, 10-19 (2005).

(56) References Cited

OTHER PUBLICATIONS

Yang et al., "Reliable group rekeying: a performance analysis," Proceedings of the 2001 conference on Applications, technologies, architectures, and protocols for computer communications, 27-38 (2001).

Yun et al., "On protecting integrity and confidentiality of cryptographic file system for outsourced storage," Proceedings of the ACM workshop on Cloud computing security, 67-76 (2009).

Zapata et al., "Securing ad hoc routing protocols," Proceedings of the 3rd ACM workshop on Wireless security, 1-10 (2002).

Zhao et al., "A message ferrying approach for data delivery in sparse mobile ad hoc networks," Proceedings of the 5th ACM international symposium on Mobile ad hoc networking and computing, 187-198 (2004).

Zhao et al., "VADD: Vehicle-assisted data delivery in vehicular ad hoc networks," IEEE Transactions on Vehicular Technology, 57(3): 1910-1922 (2008).

Zhou et al., "An optimal key distribution scheme for multicast group communication," IEEE Conference on Computer Communications (Infocom) (2010).

Zhou et al., "Constructing Efficient Attribute-Based Broadcast Encryption," IEEE Infocom 2010.

Zhou et al., "Efficient Privacy-Preserving Ciphertext-Policy Attribute Based Encryption and Broadcast Encryption," AsiaCCS (2011).

Zhou et al., "Enforcing User-Controlled Secure Data Sharing for Public Cloud Data Services," Arizona State University.

Zhou et al., "On Efficient Ciphertext-Policy Attribute Based Encryption and Broadcast Encryption," 17th ACM Conference on Computer and Communications Security (2010).

Zou et al., "A Practical and Flexible Key Management Mechanism for Trusted Collaborative Computing," INFOCOM 2008, 27th Conference on Computer Communications, 538-546 (2008).

\* cited by examiner (b) Multi-tenancy with isolated data management framework (a) Multi-tenancy with shared data management framework

SYSTEMS AND APPARATUSES FOR A SECURE MOBILE CLOUD FRAMEWORK FOR MOBILE COMPUTING AND COMMUNICATION

CROSS-REFERENCE TO RELATED APPLICATIONS

This application claims the benefit of U.S. Provisional Application No. 61/473,477 filed Apr. 8, 2011, entitled "Systems and Apparatuses for a Secure Mobile Cloud Framework for Mobile Computing and Communication," the entire contents of which are herein incorporated by reference without disclaimer.

This application is also related to U.S. patent application Ser. No. 13/440,111, filed Apr. 5, 2012, entitled "Methods, Systems, and Apparatuses for Optimal Group Key Management for Secure Multicast Communication," which claims priority to U.S. Provisional Application No. 61/473,491 filed Apr. 8, 2011, and is also related to U.S. Provisional Application No. 61/620,694, filed Apr. 5, 2012, entitled "Systems and Apparatuses for a Secure Mobile Cloud Framework for Mobile Computing and Communication." The entire contents of each of the above-referenced U.S. patent applications are incorporated herein by reference without disclaimer.

STATEMENT REGARDING FEDERALLY SPONSORED RESEARCH OR DEVELOPMENT

This invention was made with Government support under Grant No. N00014-10-1-0714 from the Office of Naval Research Young Investigator Program (ONR YIP). The Government has certain rights in the invention.

BACKGROUND OF THE INVENTION

1. Field of the Invention

This invention relates to cloud computing, and more particularly relates to a trustworthy mobile and ad hoc network (MANET) communication system. This invention also relates to cloud computing security, identity management, attributed based cryptography, and MANET routing security.

2. Description of the Related Art

Cloud computing is a new business model focusing on resource-on-demand, pay-as-you-go, and utility-computing. Cloud computing can be broadly classified as infrastructure-as-a-service (IaaS), platform-as-a-service (PaaS), and software-as-a-service (SaaS). Critical research issues for cloud computing such as computation offloading, remote execution, and dynamic composition have been extensively discussed in previous literature. Much of the existing work examined, focused on the security to enhance security of clouds themselves, such as infrastructure security based on TCG/TPM, secure outsourcing, Cloud web security, resource management and isolation, and privacy.

Cloud computing for mobile devices may enable running applications between resource-constrained devices and Internet-based Clouds. Moreover, resource-constrained devices can outsource computation/communication/resource intensive operations to the cloud. CloneCloud, for example, focuses on execution augmentation with less consideration on user preference or device status. Zhang et al. proposed elastic applications, which focus on services composition, for mobile devices via Cloud computing. Oberheide et al. presented a framework that outsources the anti-virus services from mobile devices to a Cloud. Goayl et al. proposed a secure cyber foraging mechanism for resource-constrained devices. Existing mobile Cloud solutions are limited and are solely focused on the enhancement of the individual mobile device's capability.

SUMMARY OF THE INVENTION

A novel MANET communication framework—embodiments of which are referred to in this disclosure as MobiCloud—is disclosed. First, embodiments of a new MANET infrastructure that transforms traditional MANETs into a new service-oriented communication architecture are disclosed. Embodiments of MobiCloud transfer each mobile node from a traditional strictly layer-structured communication node into a service node (SN). Each SN may be used as a service provider or a service broker according its capability, e.g., available computation and communication capabilities to support a particular service. In this way, embodiments can maximally take the advantage of each mobile node in the system by utilizing Cloud computing technologies. Second, to reduce the mobility uncertainty, embodiments of the disclosed invention incorporate every SN as a virtualized component of the MobiCloud. In some embodiments, MobiCloud mirrors an SN to one or multiple virtual images in the Cloud for addressing communication and computation deficiencies of mobile devices. Moreover, virtual images can create a visualized MANET routing and communication layer that can maximally assist the mobile nodes to enable pervasive computing services for each mobile device owner.

A secure data processing framework, which can be applied to MobiCloud, is disclosed. The secure data processing framework may comprise a cloud trusted domain comprising Extended Semi-Shadow Images (ESSI), a cloud mobile and sensing domain comprising mobile users, and a cloud public service and storage domain. The cloud trusted domain and cloud public service and storage domain are physically isolated to provide strong security protection to user's data.

Embodiments of a mobile device are disclosed. The mobile device may be configured to be a member of a mobile and ad hoc network. In one embodiment, the mobile device may comprise a wireless communication interface, a data storage device and a mobile processing device. The mobile device may also comprise a battery power source and a global position system.

The data storage device may be configured to store one or more software components; and/or one or more extended semi-shadow images, where the one or more extended shadow images may be configured to link one or more common software components through a virtual trust and provisioning domain.

The mobile processing device may be configured to optionally execute the one or more software components locally; optionally migrate execution of the one or more software components on a cloud-based computing server; optionally execute the one or more duplicated software components on a cloud-based computing server; communicate with a resource manager through the wireless communication interface, and/or provide sensing data to, e.g. a resource manager. The mobile processing device may be configured to receive instructions from the resource manager instructing whether to execute, migrate, or duplicate the execution of at least one of the one or more software components.

The software components may be platform dependent or platform independent. In one embodiment, sensing data may comprise mobile processing device type, utilization, battery state, and location. In another embodiment, sensing data may comprise mobile processing device type, utilization, battery power source state, and location, the location. The virtual trust and provisioning domain may be configured to isolate information flows between the software components contained in the extended semi-shadow images.

Embodiments of a mobile and ad hoc network are disclosed. In one embodiment, the mobile and ad hoc network comprises one or more mobile devices configured to be members of the mobile and ad hoc network; a cloud-based computing server optionally configured to execute the one or more software components whose execution has been migrated; and/or a resource manager configured to provide instructions to the one or more mobile devices whether to execute at least one of the one or more software components or migrate the execution of at least one of the one or more software components to the cloud-based computing server.

The term "coupled" is defined as connected, although not necessarily directly, and not necessarily mechanically. The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
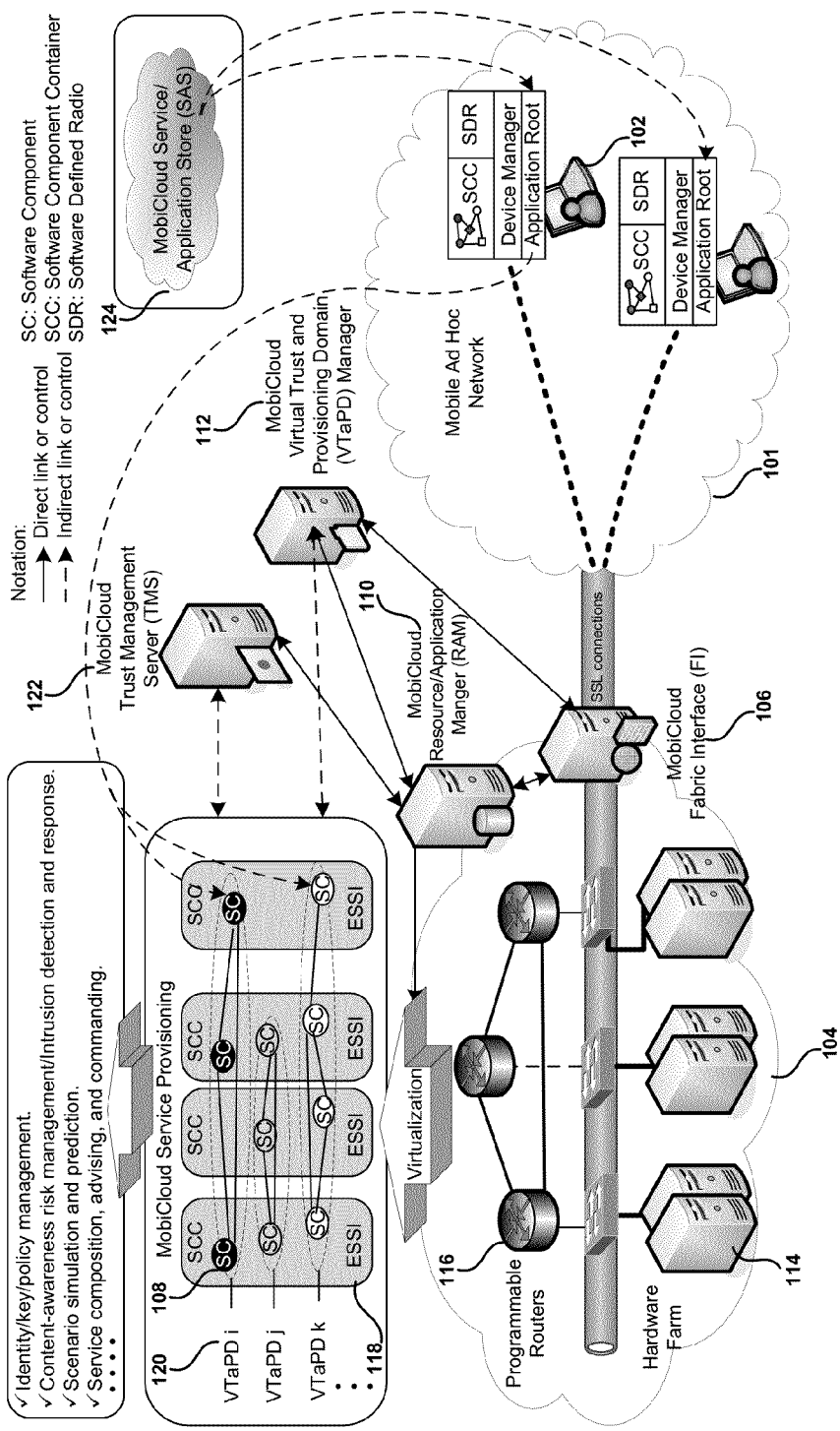
FIG. 1 illustrates one embodiment of a system for a secure mobile cloud framework for computing and communication.

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules, in order to more particularly emphasize their implementation independence. A module is "[a] self-contained hardware or software component that interacts with a larger system. Alan Freedman, "The Computer Glossary" 268 (8th ed. 1998). A module comprises a machine or machines executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

MobiCloud Architecture

The disclosed MobiCloud architecture is based on an elastic Cloud service model. Additionally, the "virtual trust and provisioning Domain (VTaPD)" may isolate the information flows that belong to different security levels using programmable router technologies. Moreover, embodiments provide fine-grained trust management and feedback/command capability to mobile users. Embodiments of MobiCloud may be designed to provide the following Cloud services for MANETs:

Serve as an arbitrator for identity, key, and secure data access policy management.

Provide security isolations to protect mobile users' information.

Monitor MANET status for risk assessments, intrusion detection and response.

Simulate scenarios and predict future MANET situations for decision making.

Provide service composition and applications for mobile devices.

As shown in FIG. 1, MANET 101 includes mobile devices (also referred to as a user device) 102. The mobile devices 102 are in communication with Cloud 104 through fabric interface (FI) 106.

In some embodiments, MobiCloud may use software components 108 (i.e., a set of software codes designed to achieve a certain function, which can be in the form of application components, software agents, and they are used interchangeably in the following context) to link the Cloud services and MANETs. A software component 108 can be platform independent such as using Java or .Net bytecode or Python script (or the like) or platform dependent, using a native code. In some embodiments, the MobiCloud is configured such that the software component may either be executed on a mobile device 102 or migrated to the Cloud 104, i.e., run on one or more nodes offered by an IaaS provider. In this way, an elastic application can dynamically augment the capabilities of a mobile device, including computation power, storage, and network bandwidth, based on the devices' status with respect to CPU load, battery power level, network connection quality, security, etc. One or more software components 108 may be controlled by the application root, which is the part of the application that provides the user interfaces and issues requests to the software components.

In some embodiments, the device manager of the user device 102 is responsible for configuring applications at launch time and making configuration changes during runtime. In some embodiments, the configuration of an application may include: where the application's components are located, whether or not components are replicated (e.g., for reliability purposes), and/or the selection of paths used for communication with other components (e.g., WiFi or 3G if such a choice exists).

In some embodiments, each device also provides sensing data. In some embodiments, this sensing data may include on the device sensing data such as processor type, utilization, battery state, and location with GPS support) and on the neighboring mobile nodes sensing data such neighbor's identity or addresses, link quality, neighboring durations, and the like. In some embodiments, this data is made available to the VTaPD Manager 112 and is used to determine the routing, and when/where a new software component instance should be launched in Software Components Containers (SCCs). Secure connections may be setup through secure tunnels, e.g., SSL connections are set up between the Cloud 104 and user devices 102.

At the Cloud side, in some embodiments, the MobiCloud Fabric Interface (FI) 106 exports a service to the user devices 102 and applications. In addition, the FI 106 may also interface to MobiCloud VTaPD manager 112 and Resource and Application Manager (RAM) 110, hardware farm 114 and other networking devices (such as programmable routers 116). Middle-ware based solutions may be required when the Cloud components do not use web-based techniques.

Programmable routers 116 may be used to create multiple VTaPDs 120. The VTaPDs in FIG. 1, for example, are represented by the dotted ovals surrounding the software components 108. VTaPDs may be created for isolating the information flows and access control by creating multiple virtual domains.

There are two main reasons for multiple virtual domains: (i) for security reason, a user's device may run multiple applications at different security levels, e.g., its simultaneous communication with two individuals with different administrative domains; and (ii) for context-awareness purpose, it is necessary to separate services for different local and network settings. For example, in some embodiments, the Cloud can simulate the operations of the MANETs using different system parameters or routing and routes selection algorithms with real-time sensing data from mobile devices. In this way, MobiCloud, in some embodiments, can compare different approaches using Cloud computing and communication resources. This approach may provide a comprehensive view of MANETs operations offering suggestions to mobile devices for decision making.

Some embodiments use an Extended Semi-Shadow Image (ESSI) 118 to represent a virtual machine of a physical wireless device. In some embodiments, this term may be differentiated from a "virtual image" in that an ESSI can be an exact clone, a partial clone, or an image containing extended functions from the physical device. In each VTaPD 120, one or multiple software components 108 may be used for every ESSI 118. For example, ESSI 118 has software components associated with VTaPD i, j, and k. The ESSI is responsible for managing the software components' loading and unloading in the ESSI. In some embodiments, the ESSI may also provide extended capabilities than just duplicating the functions of a mobile device. For example, the Cloud may be able to run services that are not available in MANETs, such as search, data mining, media processing, trust pre-establishment (e.g., credential exchange and establishing security keys in advance), etc.

In some embodiments, the MobiCloud Resource and Application Manager (RAM) 110 is the Cloud resource manager and may be directed by MobiCloud VTaPD manager 112 and MobiCloud Trust Manager Server (TMS) 122 to construct VTaPDs.

In some embodiments, the VTaPD manager 112 may be configured to take all collected context-awareness information from the MANET for decision making, such as device sensing values, location, and neighboring device status. The MobiCloud TMS 122 may be configured to be the Trust Authority (TA) for MobiCloud. It may handle the attribute-based key distribution and revocation. It also may provide identity search and federation services for mobile devices belonging to multiple administrative domains, and policy checking and enforcement functions to provide a unified trust management system for MobiCloud.

In some embodiments, the Service and Application Store (SAS) 124 serves as the repository of software components and applications. When service composition is needed, SAS may install required software components or applications through the Application Root on mobile devices. For example, when a mobile device needs to talk to another device using different frequency bands, the Software Defined Radio (SDR) needs to install a new driver and the node needs to authenticate the communication peers. In this scenario, new drivers and software components supporting authentication will be installed. This operation needs collaborations between TMS 122 and SAS 124.

In some embodiments, the VTaPDs themselves may have integrated data access control and information protection. The framework may not need/imply the division of the administrative domain into VTaPDs.

In some embodiments, the actual administrative work is handled by the MobiCloud VTaPD manager 112. Every node that belongs to a particular VTaPD may have complete routing information of its residing VTaPD, but not others. Each node can be provided by a different physical system; in some embodiments, each node would need to support the disclosed framework that includes secure group communication for sending data to the ESSIs that belong to the same VTaPD. For example, the bandwidth of a communication link of each node may be divided by using different encryption/decryption/authentication keys.

An advantage of the MobiCloud framework for network virtualization through setting up multiple VTaPDs is that it may facilitate provisioning of prioritized critical/emergency services in a network. For example, using the disclosed virtualization approach, prioritized and normal service classes can be defined using different VTaPDs; however, when only using physical MANETs, these services class must share the same operation and communication domain. In this way, some embodiments of the disclosed system may be configured to move MANET operations and communications into the Cloud when MANET peer-to-peer communication is under stress such as when mobile nodes suffer from insufficient communication bandwidth and security attacks.

To quantify the benefit in a network where protected services do get allocated prioritized provisioning in a network virtualization framework using MobiCloud, a simulation-based proof-of-concept is shown.

Some embodiments incorporate protected and dynamic network virtualization by allowing for different service classes, such as a prioritized service class over the normal service class. In a specific implementation, virtualization is performed on a per link basis; that is, to simulate the effect, a user can decide those links (representing a particular service) that are to be considered for virtualization. For activating network virtualization, attributes values of a link are encoded differently for the prioritized service on a link basis, compared to normal services; this is done, so that nodes can decide the priority for virtualization for different services in computing routes and service provisioning.

Embodiments of the MobiCloud system also may provide an integrated data access control and information isolation through a cryptography based solution.

In MobiCloud, besides the traditional security mechanisms (i.e., authentication, authorization, audit etc.), one may also need to consider additional potential security risks introduced by mobile users who share the same application instance and resources. In Cloud related literature, this working environment may also be referred to as multi-tenant environments. In some embodiments, each mobile user's ESSI can be considered as his/her tenancy in the MobiCloud. In the multi-tenant environment, data access control isolation is one of the most critically secure mechanisms that need to be addressed. The mechanism helps to prevent a user from getting privileges to access resources belonging to other tenants. There are generally two kinds of access control isolation patterns: implicit filter and explicit permission.

In the Implicit Filter Based Access Control Isolation pattern, when one tenant requests to access shared resources, a common platform level account, i.e., the ESSI identity with corresponding software component and Cloud resource requests, may be delegated to handle this request. The delegated account may be shared by all tenants and has the privileges to access resources of all tenants. However, the key of this mechanism is to implicitly compose a tenant-oriented filter that will be used to prevent one user from tapping into resources of other tenants. This may be achieved by using a cryptography based solution, i.e., group key management based solutions to secure information flow through different VTaPDs that share the same physical system.

In the Explicit Permission Based Access Control Isolation pattern, access privileges for the resources may be explicitly pre-assigned to the corresponding tenant accounts by using the Access Control List (ACL) mechanism. Therefore, there may be no need to leverage an additional common delegated account across tenants.

Another security isolation is for information protection isolation. This means to protect the integrity and confidentiality of each tenant's critical information. Theoretically, embodiments may encrypt all the information with the strongest encryption algorithm in any situation. However, security is about trade-offs in information security and performance. From a practical point of view, embodiments are disclosed that apply the following principles when making the tradeoffs with respect to the security in embodiments of MANET multi-tenant systems:

Encrypt or digitally sign the most critical information only: Generally, the criticality of data can be measured by application specific domain knowledge (i.e. data with higher security clearance) and the Service-Level Agreement (SLA) requirements of the tenants.

Select suitable encryption algorithm: Generally, encryption algorithms with stronger security may result in poorer performance. In some embodiments, mixed encryption algorithms may be adopted for the tradeoffs. For example, use the public and private key cryptography algorithm to protect symmetric keys that are finally used to encrypt data.

Consider the information access frequency: The performance will suffer more if the data with higher access frequency is encrypted.

Risk management may be defined as considering the identification, assessment, and prioritization of risks followed by a coordinated and economical application of available resources to minimize, monitor, and control the probability and/or impact of unfortunate events or to maximize the realization of opportunities. Risk management techniques may vary widely in MANETs according to whether the risk management method is in the context of the mission supporting functions, operations, or security. This disclosure focuses on two components of risk management: context-awareness routing and intrusion detection/response.

Context awareness is a concept with a broad range of meaning Literally, it indicates to take into account the "context" while making decisions. However, the definition of context may vary depending on the applications, the decisions to make, as well as the environments.

In this disclosure and with respect to MANETs, context-awareness means to give consideration to the systems parameters of the devices (e.g., battery level, CPU power), the networking parameters (e.g., bandwidth, delay, connectivity), the content (e.g., the mission specified goals), and the security (e.g., privacy, location, attacks) when using the network. This is because such environments often have highly dynamic characteristics that can significantly affect the running applications.

In order to provide seamless continuous services in such a highly dynamic network, context-awareness service migrations may be required so that the applications can be adaptive to the volatile contexts. For instance, when a node providing a certain service is running out of battery, in some embodiments, the framework should be aware of such context updating, and migrate the service (and the entire executing contexts) to another available node.

Using MobiCloud services, the data collection and processing, in some embodiments, may be handled in a centralized fashion in the Cloud; and as a result, the complexity of context-awareness operations may be greatly reduced. Moreover, MobiCloud services may also perform a test to simulate and evaluate possible operations in MANETs, and then provide better recommendations to mobile nodes. This may reduce the uncertainty of mobile system and thus improve the performance of MANET communications.

Context-awareness routing is an important component for context awareness computing in MANETs. Context such as restricted battery resource, changing topology, frequent packet drops, etc., must be taken into consideration. In the current state-of-the-art, some general context-awareness routing systems have been proposed. CAR is a routing protocol designed for delay tolerant MANETs. The design goal is to utilize the node mobility to carry and forward messages between disconnected network components. CAR uses context information such as a neighboring node's co-location history and battery status as the criteria to determine the best "carrier" with the highest delivery probability (the likelihood whether the node is a reliable next hop towards the destination). For each of these criteria, a utility value is computed using the specific utility function. These utility values are then combined together to compute the delivery probability.

In MCR, a Normalized Weighted Additive Utility Function (NWAUF) is defined for multi-criteria routing in MANETs. Energy, latency and bit error rate are used as criteria. The NWAUF is evaluated by each node in the network and may be used either with global or with local network status knowledge. Both the NWAUF and the utility calculation in CAR are very similar. They utilize an additive utility for local decisions at the individual nodes. All nodes proactively maintain routing tables. In contrast, another technique is a reactive approach.

In one embodiment of the disclosed framework, context information is requested on-demand together with routing requests. The routing requests are sent whenever a conversation needs to be established. The context criteria are sent with the routing requests so that the intermediate nodes can decide whether to forward a routing reply. And, the initiator also needs to select a path from all available paths according to certain objectives (i.e., based on utility functions).

Particularly, positioning, network topology maintenance, and routing functions may be performed by using Cloud services. In some embodiments, each node may get this information from the Cloud. In this way, the information collection and dissemination among mobile nodes may become one-to-one communication between the physical device and its shadow image in the Cloud, instead of using one-to-many communications in traditional MANET communication. This will greatly reduce the communication and management overhead among mobile nodes.

In some embodiments, a mobile node may need to monitor its local context information such as device properties (e.g., energy, CPU, and memory usage), communication parameters (e.g., packet lose ratio and delay measurement to its neighboring nodes), and security (e.g., neighboring nodes' security profiles such as identities and keys, and intrusion detection measures of neighbors). In some embodiments, these measures may be periodically sends to its shadow image, where a comprehensive risk assessment can be performed since it has the status of the entire system such as end-to-end communication delay, reachability to the destination, security status of each mobile node, etc. If the cost (computed through a utility function) of using ad hoc communications is higher than the cost of sending the information through the Cloud, the Cloud operation is preferred.

Secure Data Processing Framework

The MobiCloud transforms traditional MANETs into a new service-oriented communication architecture, in which each mobile device is treated as a Service Node (SN), and it is mirrored to one or more Extended Semi-Shadow Images (ESSIs) in the cloud in order to address the communication and computation deficiencies of a mobile device. In MobiCloud, a mobile device can outsource its computing and storage services to its corresponding ESSI and Secure Storage (SS). Moreover, the mobile device may send its sensed information such as moving trajectory to the cloud. As a return, the cloud can provide better location-based services according to the mobility information provided by the mobile device. In MobiCloud, mobile users must trust the cloud service provider to protect the data received from mobile devices. However, it is a big concern for mobile users for storing their privacy sensitive information in a public cloud.

FIG. 1 illustrates a secure data processing mobile cloud infrastructure. In certain embodiments, the mobile cloud 200 is composed by three main domains: (i) the cloud mobile and sensing domain 202, (ii) the cloud trusted domain 204, and (iii) the cloud public service and storage domain 206. In this framework, each mobile device is virtualized as an ESSI in the cloud trusted domain and each ESSI can be represented as an SN in a particular application (a.k.a., a service domain). The ESSIs can be used to address communication and computation deficiencies of a mobile device, and provide enhanced security and privacy protections. A mobile device and its corresponding ESSI can also act like a service provider or a service broker according to its capability, e.g., available computation and communication capabilities to support a particular communication or sensing service. This approach takes maximum advantage of each mobile node in the system by utilizing cloud computing technologies. In this way, the cloud's boundary is extended to the customer device domain. Note that an ESSI can be an exact clone, a partial clone, or an image containing extended functions of the physical device. The networking between a user and its ESSI is through a secure connection, e.g., SSL, IPSec, etc.

In one embodiment, an ESSI is a virtual machine that is designed for an end user having full control of the information stored in its virtual hard drive. However, the networking functions and running processes are customized through the mobile cloud service provider. The cloud trusted domain and cloud public service and storage domain are physically isolated to provide strong security protection to user's data. They can belong to two different cloud service providers.

Within the cloud trusted domain, strict security policies are enforced through a distributed Firewall system (i.e., each ESSI runs its own Firewall). Data flows in/out the trusted domain must be scanned through the distributed Firewall system to make sure no malicious traffic is sent or received. The mobile cloud data processing model includes three main components: trust management, multi-tenant secure data management, and ESSI data processing model, which are described in details in the following.

Mobile Cloud Trust Management

In some embodiments, a trust management model of mobile cloud includes identity management, key management, and security policy enforcement. An ESSI owner has the full control over the data possessed in the ESSI, and thus a user-centric identity management framework is a natural choice. The user-centric identity management (also frequently referred to as identity 2.0) allows an individual has full control of his/her identities, in which third party authenticates them. It also implies that a user has control over the data his/her sharing over the Internet, and can transfer and delete the data when required. An integrated solution involving identity-based cryptography and attribute-based data access control is disclosed, as the building blocks to construct the trust management system for mobile cloud. Particularly, the presented mobile cloud communication framework usually involves the establishment of a virtual private communication group.

In some embodiments, a Trusted Authority (TA) is assumed to manage security keys and certificates for mobile users. In the following presentation, without special notice, it is always assumed that there is a TA available, which is responsible for key and certificate distribution. Based on this assumption, the TA is responsible to deploy an Attribute-Based Identity Management (ABIDM) for mobile cloud's identity and trust management.

Figure 3:
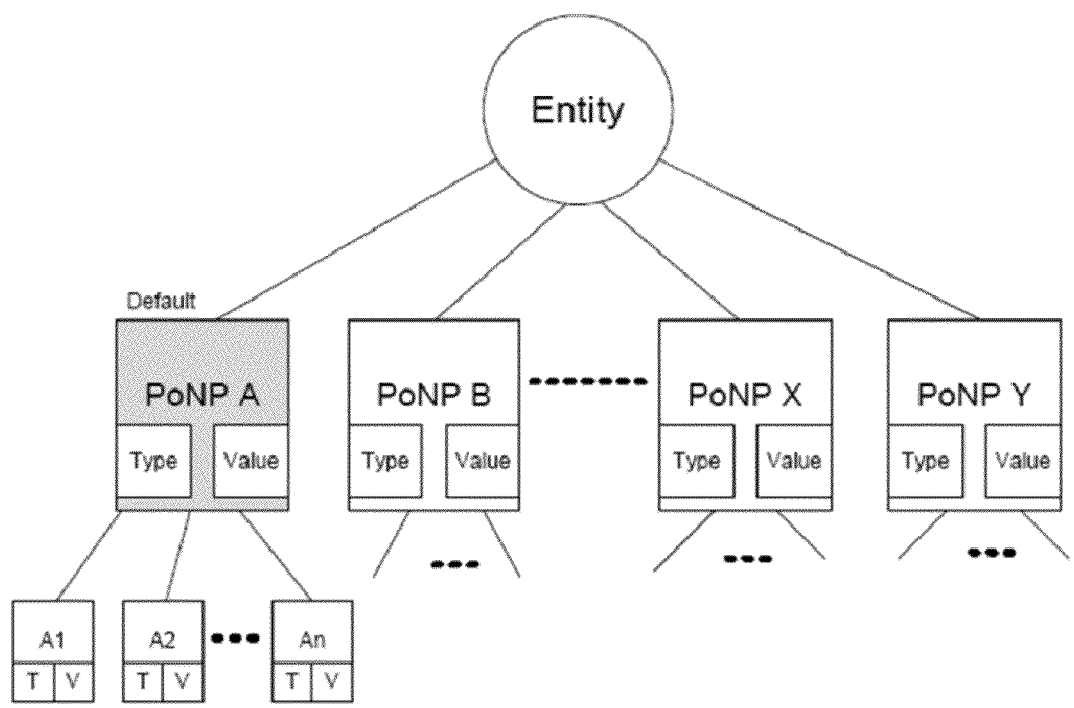
FIG. 3 illustrates an identity representation of Attribute-based Identity Management (ABIDM) for mobile cloud trust management according to one aspect of the present disclosure.

FIG. 3 illustrates a basic identity representation of ABIDM according to one aspect of the present disclosure. Using ABIDM, the inventors first need to define the "point of network presence (PoNP)". A mobile node's relationship can be thought of as lines radiating from the PoNP to the various counterparties. Each line is distinct and tagged with the attribute used by a particular counterparty. In particular, a default PoNP (i.e., native PoNP) is defined for everyone. The default PoNP has to be linked by a unique native ID. The uniqueness of the native ID is not difficult to achieve. Indeed, any user can have a unique native ID by simply hashing any one of his/her unique identifiers, such as a driver license ID, email address, social security number, etc. Each PoNP has two properties: type and value. The type value provides the information such as (i) the identity issuer, (ii) the private key issuer, and (iii) the validation period. The identity and private key issuer can be either self-generated or derived from a Trusted Authority (TA). The value of the PoNP can be used as a part of the user's identity with its type for a particular scenario. Identity-based cryptography can be used, and a private key is assigned to the PoNP identity. A message receiver can use the sender's identity to verify the received signature for authentication purpose.

In one embodiment, each PoNP is associates with one or multiple attributes (i.e., A1 . . . An), and each attribute has type and value properties. Attributes can be assigned as predefined attributes that do not change frequently, which are called as static attributes. To differentiate PoNPs, the number of attributes can be reduced for each PoNP for later secure communication.

One major benefit of using this identity representation is the "standardization" of identity management. In practice, the numbers of PoNPs for every mobile node can be restricted to a certain number of known scenarios. This can be done by consulting the TA, which provides the public key certificate services and provides the ontology of identities and attributes for mobile users. Self-managed identity and private keys can be used to form a self-managed and trusted ecosystem. This feature will be useful for managing trust based on social network applications.

Multi-Tenant Secure Data Management

Figure 2:
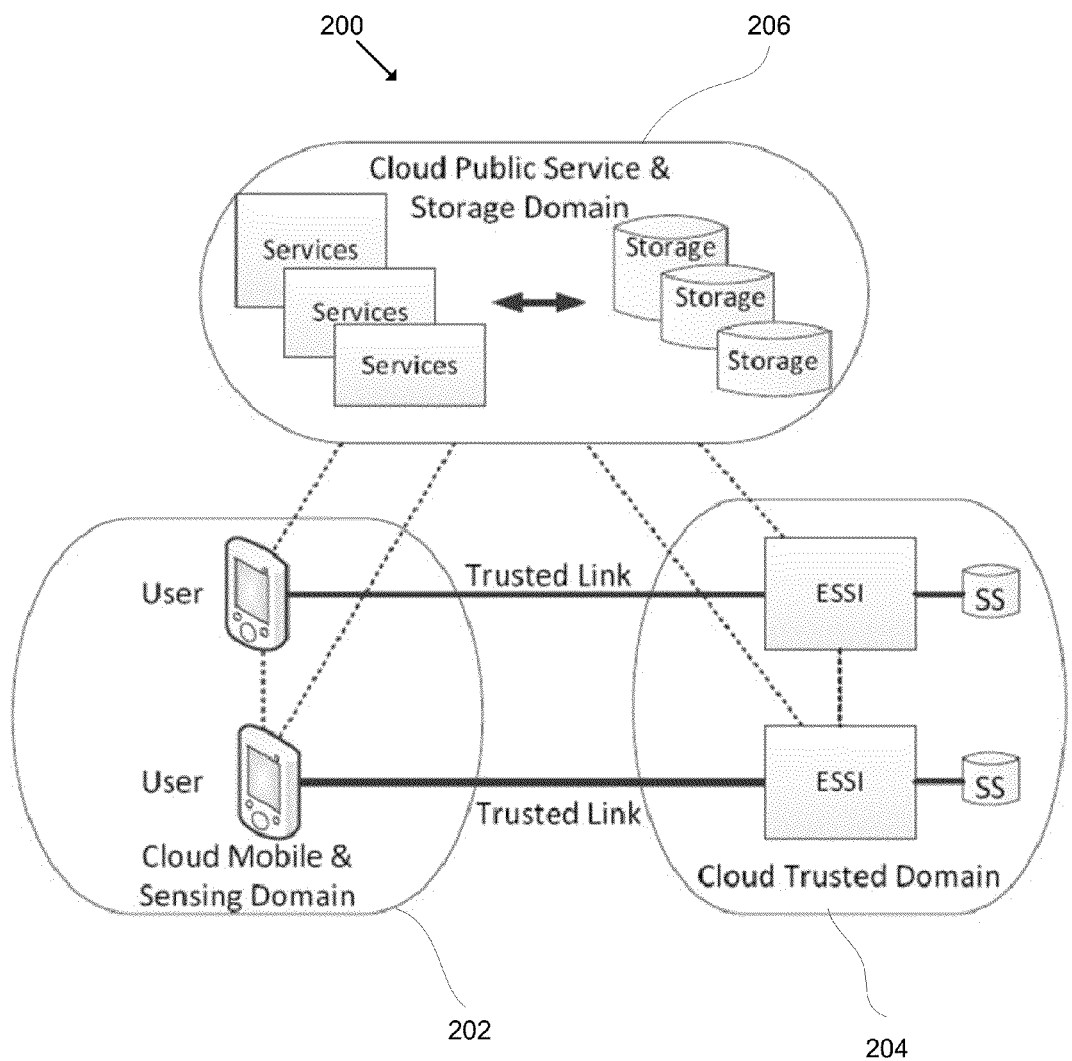
FIG. 2 illustrates a system for a secure data processing mobile cloud framework according to one aspect of the present disclosure.

As shown in FIG. 2, the dashed lines represent the ad hoc connection between entities, and the solid lines represent dedicated secure connections. The cloud public service and storage domain provides services for all mobile devices and ESSIs. A mobile device can request services directly from the public service and storage domain, or it can request services through its ESSI. An ESSI is the security policy enforcer for its associated mobile device(s). The user can specify what data should be protected and stored in its ESSI. Users' private information is maintained in their corresponding Secure Storage (SS).

Multi-tenancy is one of the key features of cloud services. To secure each user's data, traditional approaches are shown in FIG. 4A, where users' data is stored in one big database and a unique encryption key is used to secure data for each user. This approach has several drawbacks. First, it is not scalable when the database is huge. Data storage operations can incur heavy data operations that require extensive computing resources. Second, data encrypting keys for users are maintained in a centralized location, which is vulnerable to the single-point failure problem. Moreover, users usually have concerns that the cryptographic key is maintained by the cloud provider.

Figure 4B:
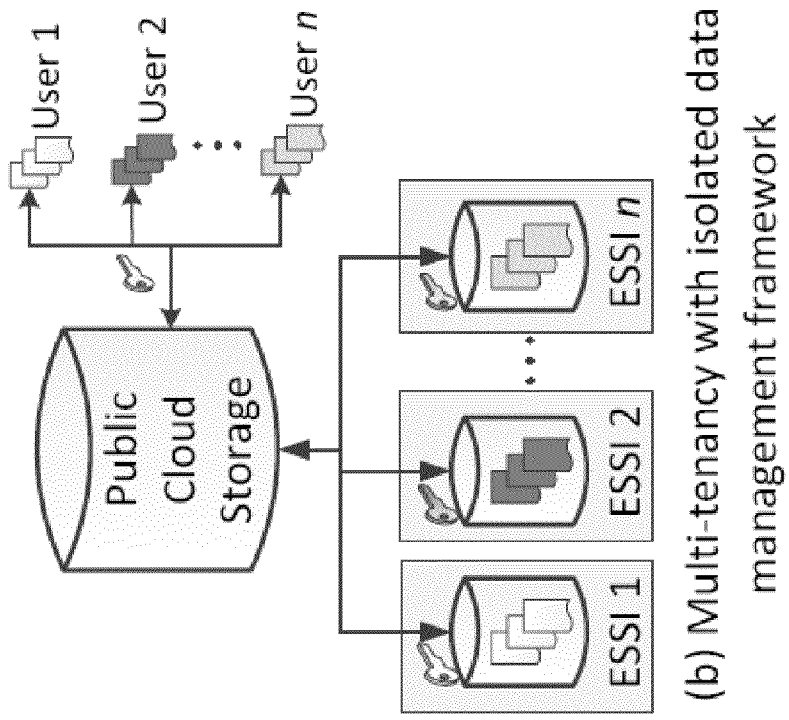
FIG. 4B illustrates a decentralized framework for multi-tenant secure data management according to one aspect of the present disclosure.
Figure 4A:
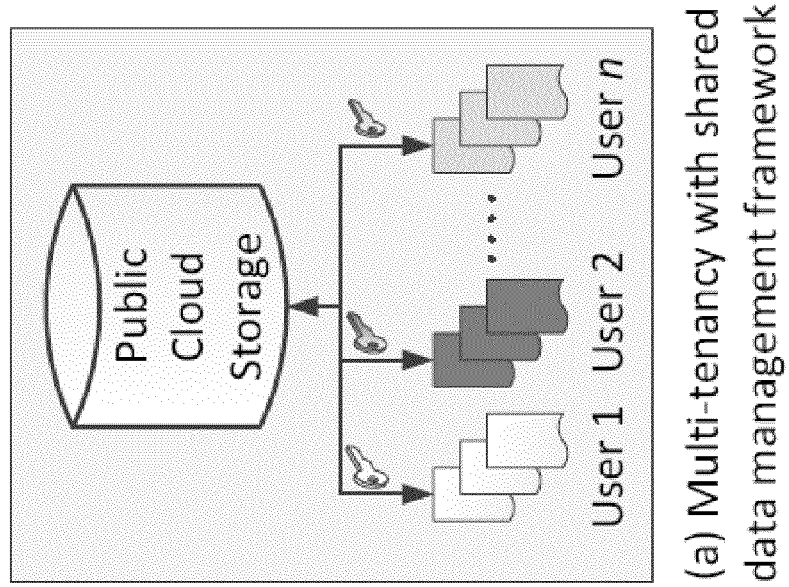
FIG. 4A illustrates a prior art framework for multi-tenant secure data management.

FIG. 4B illustrates a solution that utilizes a decentralized approach according to one aspect of the present disclosure. The disclosed multi-tenant data management system partition the data into two security levels: (i) critical data and (ii) normal data. The critical data must be secured by the data encrypting key generated by the user, and the normal data is secured by the data encrypting key generated by the cloud storage service provider. The presented multi-tenant secure data management system can address the drawbacks of traditional approaches. First, the data operations such as indexing, data retrieval, data addition, etc., are distributed to ESSIs. In addition, the security functions, such as encryption/decryption/integrity, are also distributed to ESSIs. As a result, the computation overhead is distributed to multiple processors in the cloud system. Second, ESSIs enhance the users' security by adding one additional layer of security, in which the critical data are stored in each ESSI. As a result, compromising one ESSI will not impact other ESSIs.

ESSI Data Processing Model

In one embodiment, the ESSI's data processing model may be built on the security capability model enabled for Linux Kernel 2.2 and above. Based on the security capability model, the inventors can build a Tri-rooted ESSI that has a cloud root, a user root, and an auditing root. The privilege of the user root includes maintaining user's data in its SS and encryption/decryption/verification related processes. The cloud root is to perform the maintenance functions of ESSI, and it does not have the access to SS and related security functions. The auditing root is used to log the activities of both cloud root and user root. The log data can be only accessible for investigation purpose when regulation violations are identified. Usually, the log data is maintained by a third trusted party. In this way, the cloud provider cannot easily breach the privacy of users.

Figure 5:
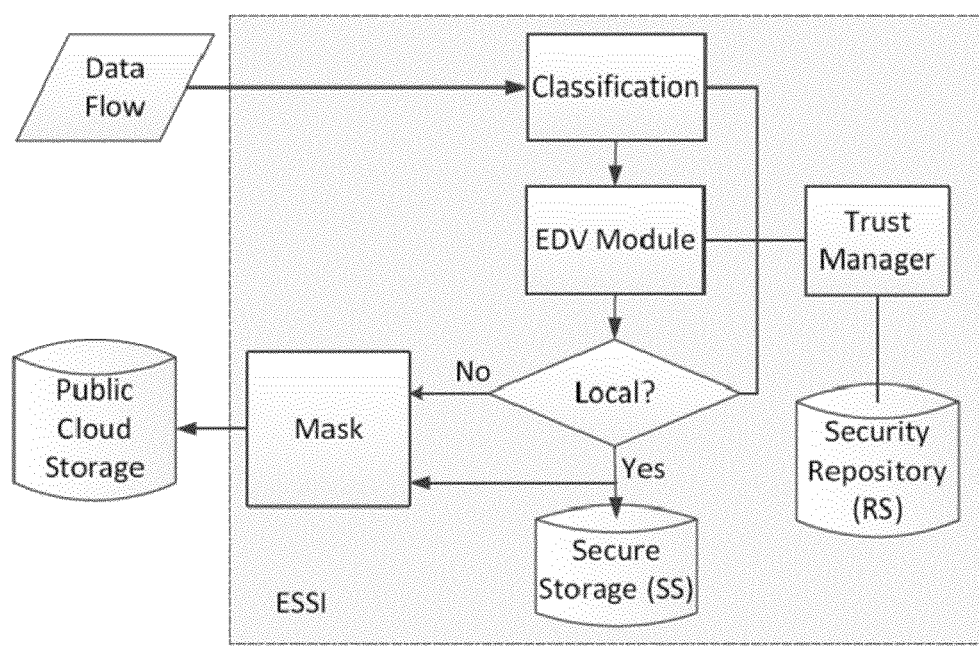
FIG. 5 illustrates a data processing model for Extended Semi-Shadow Images (ESSI) according to one aspect of the present disclosure.

FIG. 5 illustrates one embodiment of the ESSI's data processing model according to one aspect of the present disclosure. SS is installed in ESSI's virtual hard drive. A user's private information and security credentials are stored in the Security Repository (RS) managed by the ESSI mapped to the user's mobile device. The critical data is stored in the SS. Data flow arriving at the ESSI is processed as follows: (i) Data flow is inspected by the classification model that classifies the data as critical data or normal data. (ii) If the data is classified as normal, the normal data will be sent to the public cloud storage through a masking procedure. (iii) The Encryption/

Decryption/Verification (EDV) module is then used on the critical data and stores the processed data in SS. The masking procedure is used to remove private information associated with the user and anonymize the data content. The masking procedure can be configured differently according to the level of the criticality of the data. It is up to the user's preference, and it is operated through the trust manager. For example, ESSI can generate a masked index value for the public cloud storage for indexing purpose. This index value includes the ESSI's identifier (can be a pseudonym) and corresponding indexing category. Once the public cloud storage service receives the index value, it then uses it to identify which ESSI is responsible for the requested searching data.

EXAMPLES

The following describe scenarios that may be used with various embodiments of the disclosed invention. These examples are not intended to be limiting, but rather to provide specific uses for different embodiments of the disclosed invention.

Example

Inter-Operable Scenario

A search team is searching for a lost soldier in an area, where they have located equipment that might belong to the soldier. Due to security protection, the search team cannot read the identification stored in the RFID tag affixed to the equipment. Here, they can proxy the communication between the tag and the back end server running in MobiCloud. In this scenario, interoperability is the major issue, which originates from two sources: (1) two wireless devices running two different protocols (or different versions of software), and (2) two wireless devices belonging to two different administrative domains and thus using different security parameters (e.g., cryptographic keys). To address this problem, the search team's wireless devices may not be programmed to read the RFID tag. However, with the capability of software defined radios, the search teams can utilize necessary functions and services from the Cloud to enable such a capability on their wireless devices.

In the meantime, the Cloud can also help the search team set up a secret key between the tag and reader. As another example, if the rescue team needs to locate the soldier's location based on the signal transmitted from a wireless device that he/she carries, the rescue team may need new services for location tracking Localization usually requires a synchronized environment to run a triangulation algorithm. The MobiCloud can compose a time synchronization service and software on wireless devices to enable the ad-hoc positioning capability for rescue team members.

Example

Efficient Communication Scenario

Communications overhead due to MANET routing contributes a great portion of MANET bandwidth consumption. To demonstrate the routing overhead, a simulation-based study is presented. The study used a group mobility model using two on-demand routing protocols, AODV and DSR, where 60 mobile nodes were deployed, where each node randomly selects its moving velocity between 10 m/s and 30 m/s. It is shown that the routing traffic ratio to overall traffic increases when less data are transmitted (i.e., data packets are sent for every 1 second). This application demonstrates that overall ratio of routing overhead can be even greater when the MANET is under stress, e.g., communication speed is reduced due to poor communication channel quality or frequent link changes among mobile nodes. This will make the MANET data communication more congested. With MobiCloud support, mobile nodes do not need to perform path searching and maintenance for routing purposes; instead, each mobile node only needs to monitor the connectivity and channel quality to its neighboring nodes and updates this information to its ESSI (Extended Semi-Shadow Image) in the Cloud. The Cloud will perform routing and inform the node on how to forward packets.

Example

Security and Service Isolation Scenario

With the development of wireless technology, a smart phone can serve as a personal information gateway. It can communicate with a variety of wireless devices belonging to different administrative domains. Running more applications will increase the threats of malware that can be installed in the smart devices and then jeopardize the critical information processed in the device. Using MobiCloud, one or multiple ESSIs running multiple services on different physical computing systems in the Cloud for a mobile device can be initiated. In this way, attackers can be prevented from manipulating caching operations to steal users' private information in the Cloud. Moreover, the system complexity of wireless devices is reduced by running simple and trusted software, and hence the chance of being compromised is also reduced. The isolation of services can also help commanders decide on effective methods to operate the MANET. For example, context-awareness routing needs to consider the situations of MANET using a set of predefined parameters (such as battery status, communication channel qualities, previous communication and neighboring history of a node, etc.) to determine a packet forwarding strategy. To this end, the Cloud can create a virtual routing domain to emulate the routing behaviors of the MANET and then provide suggestions to commanders for decisions.

EXAMPLE

Delay Tolerance and Communication Scenario

Traditional delay tolerance networks consider each mobile device as both a communication device and a storage device. They maintain received information and deliver this information to the intended destination when they are back online. The uncertainty of this communication model is very high due to unpredictable mobility and storage status of neighboring devices. MobiCloud will reduce the uncertainty by functioning as an information repository. Thus, the message originator, forwarder, and receiver know that the MobiCloud is the repository for sending, forwarding, and retrieving information.

Example

Mobile Cloud Trust Management

An ABIDM example is presented as follows, according to the basic identity representation of ABIDM shown in FIG. 3.

Identity Representation:
  PoNP: {Native},Type: {ID,TA, ExpDate},Value: {011};
    $A_0$: {attribute},Type: {name},Value: {identity→David Kurt};
    $A_1$: {attribute},Type: {B¯0}, Value: {0};
    $A_2$: {attribute},Type: {B1}, Value: {1};
    $A_3$: {attribute},Type: {B2}, Value: {1};
  PoNP: {identity},Type: {name, Self-Gen, ExpDate}, Value: {David Kurt};
    $A_j$: {attribute},Type: {organization}, Value: {ASU-Fulton-CIDSE-CSE}
    $A_{j+i}$: {attribute},Type: {device},Value: {communication→Mac address→01:23:45:67:89:ab};
    $A_{j+2}$: {attribute},Type: {email},Value: {David.Kurt@asu.edu};
    . . . .
  PoNP: {communication},Type: {Mac address,TA, ExpDate}, Value: {01:23:45:67:89:ab}
    $A_k$: {attribute},Type: {organization}, Value: {ASU-Fulton-CIDSE-CSE}
    $A_{k+1}$: {attribute},Type: {owner},Value: {David Kurt};
    $A_{k+2}$: {attribute},Type: {device model},Value: {iPhone 3G};
    . . . .

The first PoNP is "Native," in which its value is unique for each entity. Attribute $A_0$ usually points to other PoNPs. The number of bits for the ID value should be long enough to guarantee that every entity will have a unique value, where $B_x$ represents the bit at position x from the leftmost side. For demonstration purposes, three bits are used for the native ID value. The second PoNP describes the identity "David Kurt" and his associated attributes; the attribute "organization" describes where David works; the device attribute points to another PoNP "communication"; email is another attribute for David. The third PoNP is "communication", the entity is represented by a MAC address and the attribute "owner" describes who owns this device.

In this example, attributes for different PoNP can be overlapped; on the other hand, an attribute in one PoNP may not exist in another PoNP. It also shows that ABIDM can easily integrate both the organization-centric IDM and user-centric IDM by considering an organization as an attribute for a user. The disclosed method uses data objects to represent attributes and use name objects to construct name graphs, where a name graph is rooted by the user's name and directional links are pointed from the user's attributes. ABIDM introduces a user graph approach, where directional links link PoNP to its attributes. An attribute can also point to another PoNP (e.g., {communication→Mac_address→01:23:45:67:89:ab}).

From the identity management perspective, "*.David Kurt" can be used as an entity. However, it might not be meaningful in a mobile cloud since there may be many individuals called DavidKurt. Thus, practically, more attributes values can be involved, such as:

*.David Kurt|ASU-Fulton-CIDSE-CSE or

*.David Kurt.01:23:45:67:89:ab, where "." represents a pointer to next PoNP attribute value and "|" separates attributes within the same PoNP. * represents the bit-assignment values in the native PoNP, e.g., *=h(David Kurt|ASU-Fulton-CIDSE-CSE)=011 and h( ) is publicly known hash function. In this example, David Kurt may have multiple native values (e.g., another is derived from **=h(David Kurt.01:23:45:67:89:ab)=101). The user needs to derive the private key for its native ID from the TA for later secure communication.

Attribute-Based Group Formation and Private Key Generation

In the mobile cloud communication environment, a secure communication session can be either one-to-one or one-to-many (e.g., an ESSI wants to share a picture with several ESSIs, which form an ad hoc group). In the terminology of secure group communication, these communication patterns can be represented as group (or subgroup) communication. Thus, a shared key needs to be established among group members. In literature, a secure group communication includes 3 phases: (i) secrets pre-distribution, (ii) group key update, and (iii) secure group communication. Phase (i) can be done offline before sending the encrypted data. Based on current hardware/software solutions, phase (iii) can be processed very quickly. Thus, the main bottleneck is in phase (ii). To address this bottleneck, the design goal is to reduce the group-based key management overhead and support efficient key distribution in a dynamic communication environment, where the communication peers may keep on changing.

Attribute Based Encryption (ABE) had been proposed for data encryption and decryption. ABE is an extension of IBE scheme in that multiple public known attributes as the public key. Using threshold secret sharing scheme, the encryptor can construct an data access policy by forming an encryption policy tree, where leaf nodes are attributes and the internal nodes are logical gates such as "AND" and "OR". To integrate ABE with the presented identity management scheme, the inventors present an novel approach that each bit in a native ID can be assigned to a unique attribute, and the attribute does not need to be meaningful (i.e., can be any randomly generated string. Based on the previously presented example, assume that David Kurt needs to communicate with a group of routers with addresses {001, 011, 100, 101, 110, 111}, in which users {000, 010} are not included. A naive approach is to construct an access tree by using an "OR" (or +) logic at the root. To reduce the number of involved attributes, a membership function (M) using Boolean Function Minimization (BFM) approach is used:

$$M_{\{001,011,100,101,110,111\}} = \overline{B}_1\overline{B}_2B_3 + \overline{B}_1B_2B_3 + B_1\overline{B}_2\overline{B}_3 + B_1\overline{B}_2B_3 + B_1B_2\overline{B}_3 + B_1B_2B_3 = B_0 + B_2$$

where $B_i$ and $\overline{B}_i$ represent the bit values "1 and 0", respectively, at position i. The final group access tree only involves two attributes assigned to $B_0$ or $B_2$ to secure the encrypted data, in which both group members 000 and 010 are not able to access.

Bootstrap of Secure Communication Group

ABIDM uses identity-based signature schemes for authentication and attribute-based encryption scheme for data access control. A mobile user uses ABIDM to establish a virtual private communication service among ESSIs. The goal of ABIDM is to establish a common sharing group key among a selected group of users (or ESSIs). Based on the presented example, the bootstrap of the secure group communication using ABIDM is presented as follows:

Sender 011 would like to establish a virtual private communication group {001.011, 100, 101, 110, 111}
  Sender 011 uses BFM to derive the group-based attribute composition as $B_0+B_2$, where "+" is a logical OR gate.
  Sender 011 uses attribute-based encryption scheme to encrypt a group key $k_g$
  Sender 011 generates the signature for the encrypted message based on identity-based signature scheme (e.g., using the private key of identity "011".

Sender 011 sends the encrypted group key and its signature to receivers.

Each receiver verifies the signature and decrypts the group key $k_8$. Note that the verification is based on the sender's ID (i.e., 011) and see if it satisfies the logic $B_0+B_2$.

Then, the group-based secure communication session begins.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

REFERENCES

[1] X. Zhang, J. Schiffman, S. Gibbs, A. Kunjithapatham, and S. Jeong, "Securing elastic applications on mobile devices for cloud computing," in *Proceedings of the 2009 ACM workshop on Cloud computing security,* 2009, pp. 127-134.

[2] J. Oberheide, K. Veeraraghavan, E. Cooke, J. Flinn, and F. Jahanian, "Virtualized in-cloud security services for mobile devices," in *Proceedings of the First Workshop on Virtualization in Mobile Computing,* 2008, pp. 31-35.

[3] S. Goyal and J. Carter, "A lightweight secure cyber foraging infrastructure for resource-constrained devices," in *Proceedings of the 6th IEEE Workshop on Mobile Computing Systems and Applications,* 2004, pp. 186-195.

What is claimed is:

1. A mobile device configured to be a member of a mobile and ad hoc network comprising:
   a wireless communication interface;
   a data storage device configured to store:
      one or more software components;
      one or more duplicated software components; and
      one or more extended semi-shadow images, wherein the one or more extended shadow images may be configured to link one or more common software components through a virtual trust and provisioning domain, wherein the one or more extended semi-shadow images each comprise a virtual machine that mirrors a different mobile processing device, and wherein the one or more extended semi-shadow images each comprise a secure storage (SS), and wherein the data storage device is configured to process data arriving at the one or more extended semi-shadow images by:
         classifying data as critical data or normal data;
         sending the normal data to public cloud storage through a masking procedure; and
         encrypting the critical data for storage in the secure storage of the one or more extended semi-shadow images; and
   a mobile processing device configured to:
      execute the one or more software components locally;
      migrate execution of the one or more software components on a cloud-based computing server;
      execute the one or more duplicated software components on a cloud-based computing server; and
      provide sensing data.

2. The mobile device of claim 1, wherein the one or more software components may be platform dependent or platform independent.

3. The mobile device of claim 1, the mobile processing device configured to be in communication with a resource manager through the wireless communication interface.

4. The mobile device of claim 3, wherein providing sensing data comprises providing sensing data to the resource manager.

5. The mobile device of claim 1, the mobile processing device further configured to receive instructions from the resource manager instructing whether to execute, migrate, or duplicate the execution of at least one of the one or more software components.

6. The mobile device of claim 1, further comprising:
   a battery power source; and
   a global position system.

7. The mobile device of claim 1, wherein sensing data at least comprises mobile processing device type, utilization, battery state, and location.

8. The mobile device of claim 7, wherein sensing data at least comprises mobile processing device type, utilization, battery power source state, and location, the location determined using a global positioning system.

9. The mobile device of claim 1, the virtual trust and provisioning domain configured to isolate information flows between the software components contained in the extended semi-shadow images.

10. The mobile device of claim 1, wherein the one or more extended semi-shadow images are each customized for a respective different mobile processing device.

11. A mobile and ad hoc network comprising:
   one or more mobile devices configured to be members of the mobile and ad hoc network, the mobile devices comprising:
      a wireless communication interface;
      a data storage device configured to store:
         one or more software components;
         one or more duplicated software components; and
         one or more extended semi-shadow images, wherein the one or more extended shadow images may be configured to link one or more common software components through a virtual trust and provisioning domain, wherein the one or more extended semi-shadow images each mirror a virtual machine of a different mobile processing device, and wherein the one or more extended semi-shadow images each comprise a secure storage (SS), and wherein the data storage device is configured to process data arriving at the one or more extended semi-shadow images by:
            classifying data as critical data or normal data;
            sending the normal data to public cloud storage through a masking procedure; and
            encrypting the critical data for storage in the secure storage of the one or more extended semi-shadow images;
      a mobile processing device configured to:
         execute the one or more software components;
         migrate execution of the one or more software components on a cloud-based computing server;
         execute the one or more duplicated software components on a cloud-based computing server; and
         provide sensing data;

the cloud-based computing server configured to execute the one or more software components whose execution has been migrated; and a resource manager configured to provide instructions to the one or more mobile devices whether to execute at least one of the one or more software components or migrate the execution of at least one of the one or more software components to the cloud-based computing server.

12. The network of claim 11, wherein the one or more software components may be platform dependent or platform independent.

13. The network of claim 11, the mobile processing device configured to be in communication with a resource manager through the wireless communication interface.

14. The network of claim 13, wherein providing sensing data comprises providing sensing data to the resource manager.

15. The network of claim 14, the resource manager further configured to determine the instructions based on the sensing data.

16. The network of claim 11, wherein the mobile processing device further comprises:

a battery power source; and a global position system.

17. The network of claim 11, wherein sensing data at least comprises mobile processing device type, utilization, battery state, and location.

18. The network of claim 17, wherein sensing data at least comprises mobile processing device type, utilization, battery power source state, and location, the location determined using a global positioning system.

19. The network of claim 11, the virtual trust and provisioning domain configured to isolate information flows between the software components contained in the extended semi-shadow images.

20. The network of claim 11, wherein the one or more extended semi-shadow images are each customized for a respective different mobile processing device.

* * * * *